(12) United States Patent
Yamada et al.

(10) Patent No.: US 7,988,310 B2
(45) Date of Patent: Aug. 2, 2011

(54) SHEET-SHAPED LIGHTGUIDE MEMBER, OPERATION PANEL-LIGHTING DEVICE AND ELECTRONIC DEVICE

(75) Inventors: Tatsuro Yamada, Fujiyoshida (JP); Hiroto Isoda, Fujiyoshida (JP); Kenji Kusano, Yamanashi-ken (JP)

(73) Assignee: Citizen Electronics Co., Ltd., Fjiyoshida-shi, Yamanashi-ken (JP)

( * ) Notice: Subject to any disclaimer, the term of this patent is extended or adjusted under 35 U.S.C. 154(b) by 284 days.

(21) Appl. No.: 12/332,611

(22) Filed: Dec. 11, 2008

(65) Prior Publication Data

US 2009/0154193 A1    Jun. 18, 2009

(30) Foreign Application Priority Data

Dec. 12, 2007 (JP) ................. 2007-320882
Dec. 20, 2007 (JP) ................. 2007-328250

(51) Int. Cl.
*G01D 11/28* (2006.01)

(52) U.S. Cl. ............... 362/26; 362/23; 362/24; 362/27; 362/602; 362/612

(58) Field of Classification Search ............ 362/24, 362/602, 610, 612, 623, 624, 627, 628, 23, 362/26, 27

See application file for complete search history.

(56) References Cited

U.S. PATENT DOCUMENTS

| | | | | |
|---|---|---|---|---|
| 6,026,283 | A * | 2/2000 | Stephenson | 455/575.1 |
| 6,074,070 | A * | 6/2000 | Sasako | 362/607 |
| 7,407,314 | B2 * | 8/2008 | Hsu et al. | 362/610 |
| 7,543,971 | B2 * | 6/2009 | Lee et al. | 362/616 |
| 7,572,023 | B2 * | 8/2009 | Chen | 362/26 |
| 7,740,390 | B2 * | 6/2010 | Lee et al. | 362/612 |
| 7,794,130 | B2 * | 9/2010 | Chung et al. | 362/612 |
| 2007/0062793 | A1 * | 3/2007 | Hung | 200/310 |
| 2009/0154138 | A1 * | 6/2009 | Isoda et al. | 362/97.1 |

FOREIGN PATENT DOCUMENTS

JP    2001-167655 A    6/2001

* cited by examiner

*Primary Examiner* — Stephen F Husar
*Assistant Examiner* — James W Cranson
(74) *Attorney, Agent, or Firm* — Brinks Hofer Gilson & Lione

(57) ABSTRACT

A sheet-shaped lightguide member has a first surface (11A), which is divided into at least two areas. The sheet-shaped lightguide member has the first surface (11A) and a second surface (11B) that face each other and a peripheral edge surface (11C). The lightguide member receives light through at least a part of the peripheral edge surface, guides the light, and emits the guided light from the first surface (11A) serving as a light exit surface. The lightguide member is divided into the at least two light exit areas (14A, 14B) and has a light-blocking part (18) provided along a boundary between mutually adjacent light exit areas to block transmission of light between the adjacent light exit areas.

17 Claims, 7 Drawing Sheets

SHEET-SHAPED LIGHTGUIDE MEMBER, OPERATION PANEL-LIGHTING DEVICE AND ELECTRONIC DEVICE

RELATED APPLICATIONS

This application claims priority under 35 U.S.C. §119 to Japanese Patent application No. JP2007-320882 filed on Dec. 12, 2007 and Japanese Patent application No. JP2007-328250 filed on Dec. 20, 2007, the entire contents of which are hereby incorporated by reference.

TECHNICAL FIELD

The present invention relates to a lightguide member and an operation panel having light-transmitting display portions from a back the operation panel.

RELATED ART

Among electronic devices, such as mobile phones, personal digital assistants (PDAs), mobile personal computers (PCs) and mobile game machines, are those which have an operation panel having light-transmitting display areas and a lighting device provided at a back of the operation panel to apply light to the operation panel from the back thereof, and thus, operations on the operation panel in dark places are facilitated.

For example, Japanese Patent Application Publication No. 2001-167655 proposes an operation panel-lighting device including an operation panel having a plurality of operation keys and a substrate disposed underneath the operation panel and having a plurality of switching elements arranged to correspond to the operation keys. The lighting device further includes a pliable lightguide plate disposed between the operation panel and the substrate. The lightguide plate receives light from an LED light source through a side edge surface thereof, guides the light therethrough and emit the light from a surface of the lightguide plate, the surface facing the operation panel to illuminate the panel.

Figure 6:
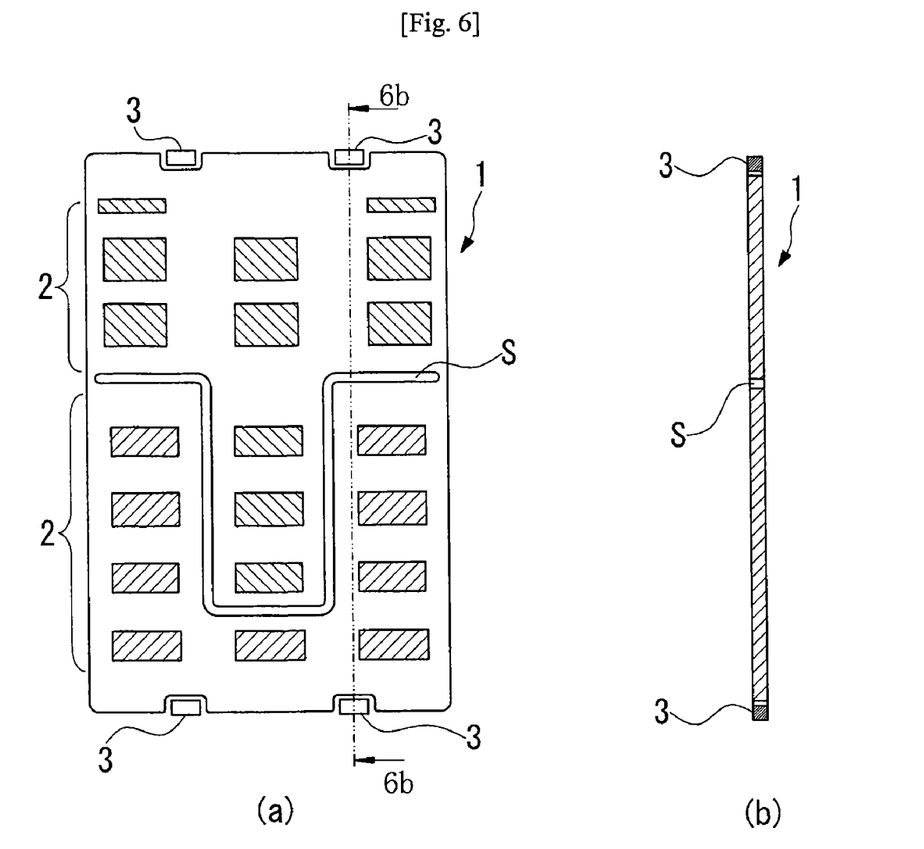
FIG. 6 is a diagram illustrating a sheet-shaped lightguide member having a structure, on the basis of which the sheet-shaped lightguide member of the present invention was developed, of which: part (a) is a plan view of the lightguide member; and part (b) is a sectional view taken along the line 6b-6b in part (a).
Figure 7:
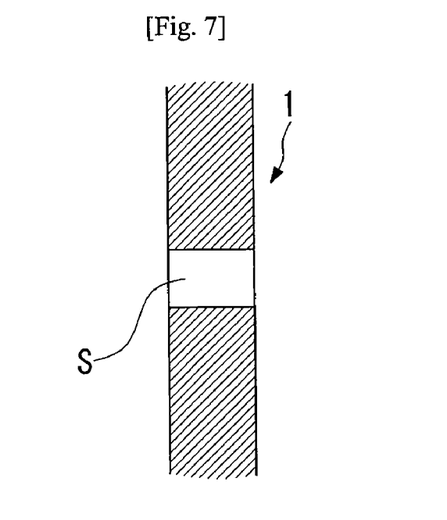
FIG. 7 is an enlarged sectional view of a main part of the sheet-shaped lightguide member shown in part (b) of FIG. 6.
Figure 8:
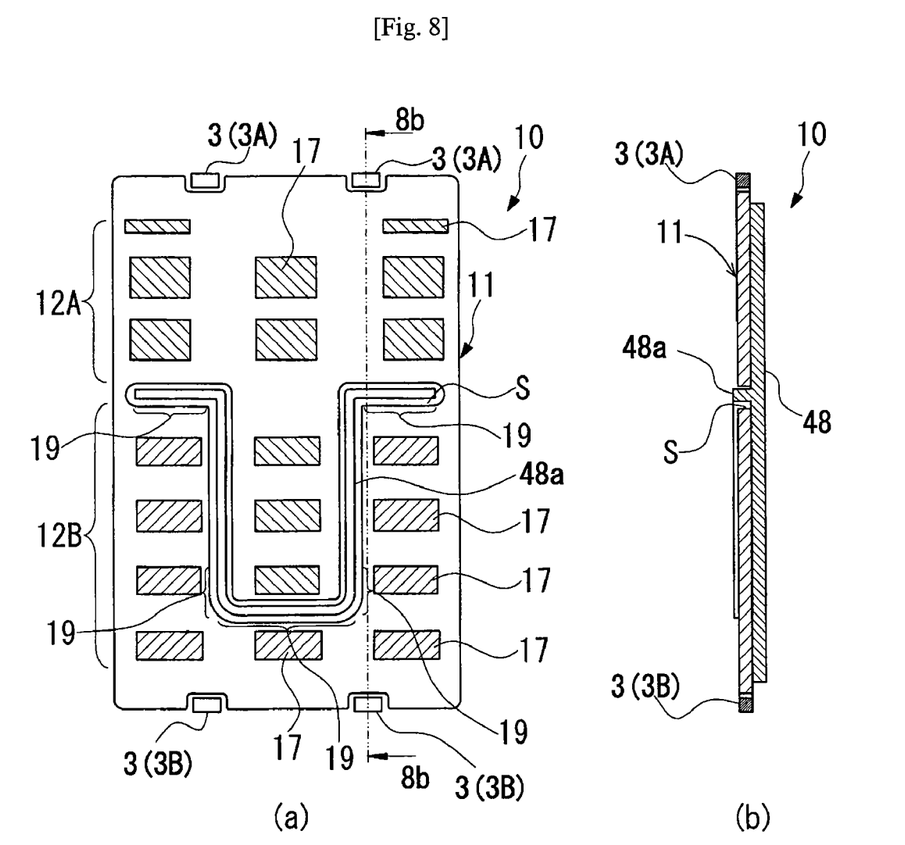
FIG. 8 is a diagram illustrating a sheet-shaped lightguide member according to a third embodiment of the present invention, of which: part (a) is a plan view of the lightguide member; and part (b) is a sectional view taken along the line 8b-8b in part (a).
Figure 9:
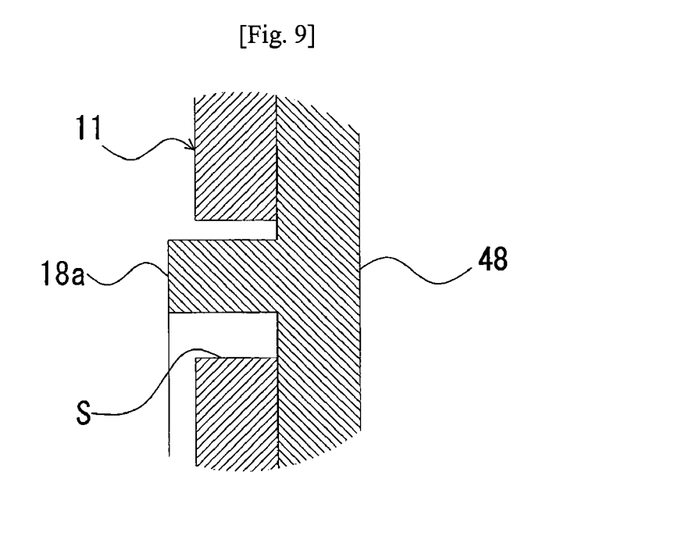
FIG. 9 is an enlarged sectional view of a main part of the sheet-shaped lightguide member shown in part (b) of FIG. 8.
Figure 10:
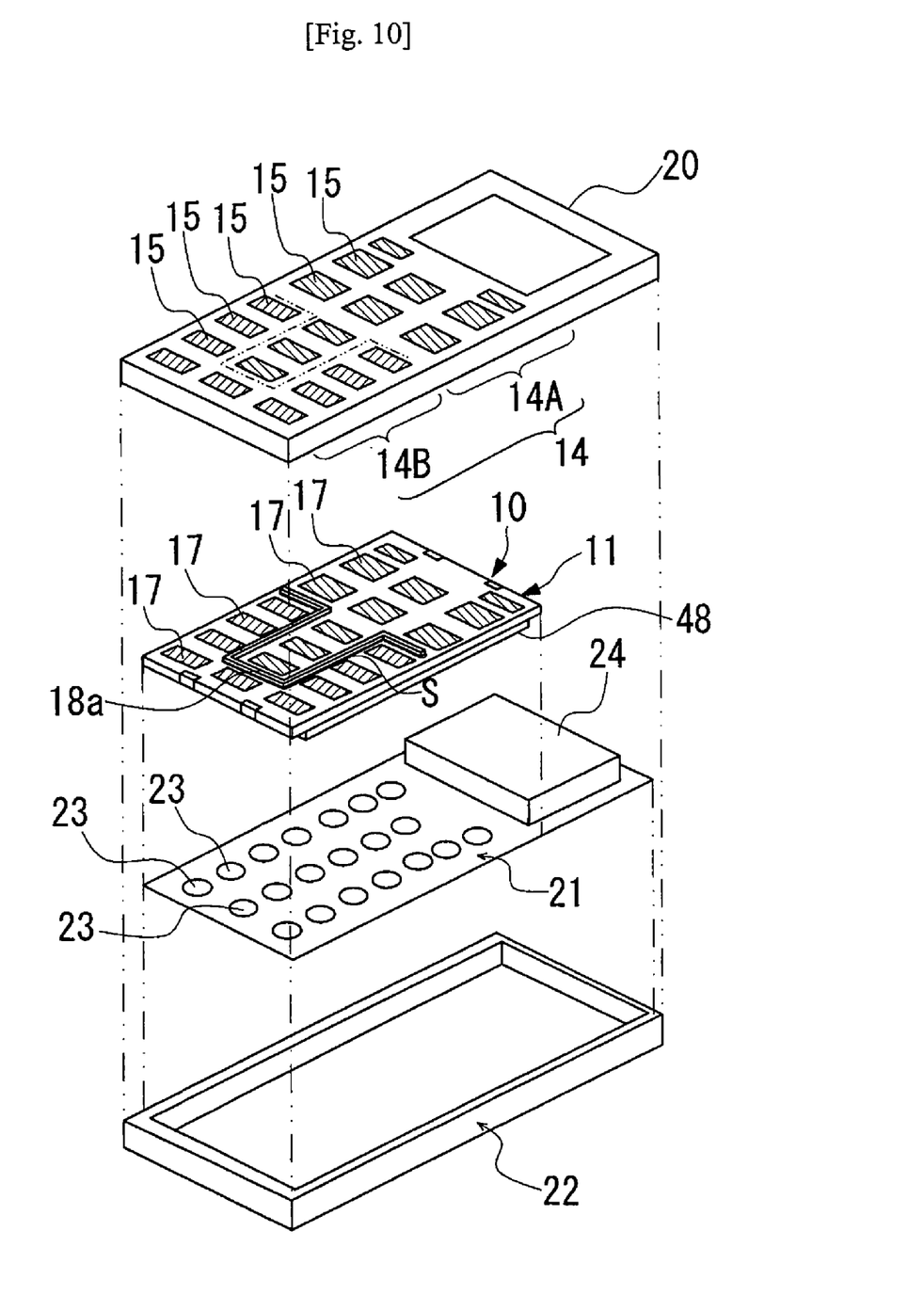
FIG. 10 is an exploded perspective view of a mobile phone using the sheet-shaped lightguide member shown in FIG. 8.
Figure 11:
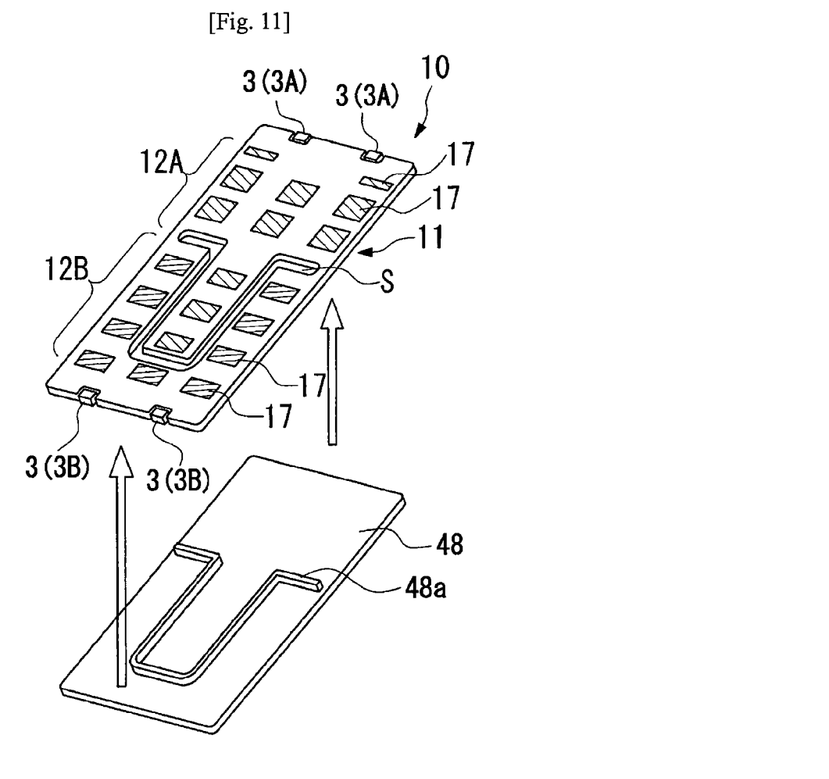
FIG. 11 is an exploded perspective view of the sheet-shaped lightguide member shown in FIG. 8.
Figure 12:
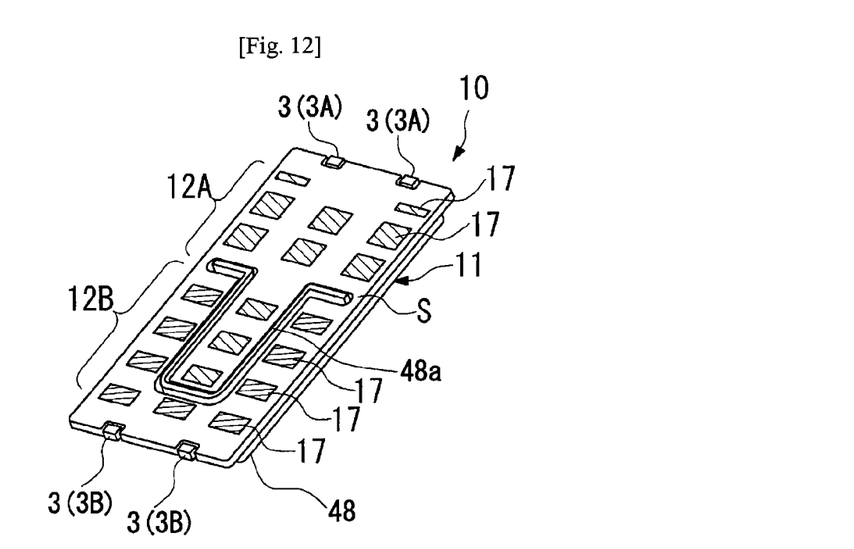
FIG. 12 is a perspective view of the sheet-shaped lightguide member shown in FIG. 8.

With the above-described conventional lighting device, however, it is difficult to individually illuminate at least two divided areas of the operation panel because the lighting device uses a single lightguide plate. It is possible to directly illuminate the divided areas with LED light sources provided for the respective display areas without using a lightguide plate. In this case, however, the number of LED light sources installed increases, resulting in an increase in the parts cost. It is conceivable to adopt an arrangement such as that shown in FIGS. 6 and 7, for example. That is, a lightguide plate 1 is provided with a slit S to divide the lightguide plate 1 into a plurality (two in the illustrated example) of areas, and lights are introduced into the divided areas from light sources 3 provided along the respective edges of the divided areas. The lights introduced into the respective areas are emitted toward the operation panel independently of each other. It has been found, however, that the desired purpose cannot been attained with the structure that is merely provided with a slit S because light is undesirably guided between the above-described areas.

SUMMARY OF THE INVENTION

Accordingly, an object of the present invention is to solve the above-described problems with the related art.

The present invention provides a sheet-shaped lightguide member having a first surface and a second surface that face each other and a peripheral edge surface. The lightguide member that receives light entering through at least a part of the peripheral edge surface and guides the light in the sheet-shaped lightguide member emits the guided light from the first surface. The lightguide member is divided into at least two light exit areas and has a light-blocking part provided along a boundary between mutually adjacent light exit areas to block transmission of light between the mutually adjacent light exit areas.

Because it is provided with the light-blocking part, the sheet-shaped lightguide member can receive, guide, deflect and emit light for each light exit area.

Specifically, the light-blocking part may have a slit provided along the boundary between the mutually adjacent light exit areas. The slit extends through the sheet-shaped lightguide member from the first surface to the second surface to separate the mutually adjacent light exit areas from each other. With the slit separating the light exit areas from each other, the light-blocking part enables various forms of light blocking.

More specifically, at least a part of a wall surface defining the slit may be coated with a light-blocking material that blocks transmission of light between the mutually adjacent light exit areas. The light-blocking material may be a white, black or silver coating material, for example.

In this case, at least a part of the wall surface defining the slit may project from the first surface to a side opposite to the second surface, and the projecting part may also be coated with the light-blocking material. This structure blocks transmission of light between the mutually adjacent light exit areas even more surely.

As another embodiment, the light-blocking part may have a light-blocking wall that is inserted into at least a part of the slit to block transmission of light between the mutually adjacent light exit areas. In this case, the light-blocking wall may project from the first surface to a side opposite to the second surface to block transmission of light between the mutually adjacent light exit areas even more effectively.

In this case, the sheet-shaped lightguide member may further have a sheet-shaped reflecting member disposed adjacent to the second surface to reflect light exiting from the second surface, and the light-blocking wall may be provided to project from the sheet-shaped reflecting member.

In addition, the present invention provides a lighting device including a sheet-shaped lightguide member having a first surface and a second surface that face each other and a peripheral edge surface. The lighting device further includes at least one light source disposed to face at least a part of the peripheral edge surface. The sheet-shaped lightguide member has a slit extending through the sheet-shaped lightguide member from the first surface to the second surface and having a surface facing the light source. The slit has a light-blocking material disposed on at least a part of the surface facing the light source.

In addition, the present invention provides an operation panel-lighting device including the above-described sheet-shaped lightguide member. The first surface of the sheet-shaped lightguide member is disposed adjacent to a back of an operation panel having light-transmitting display portions. The operation panel-lighting device further includes at least one light source provided adjacent to the peripheral edge surface of the sheet-shaped lightguide member to emit light into at least one of the light exit areas.

In addition, the present invention provides an electronic device including an operation panel having light-transmitting display portions and the above-described lighting device. The first surface of the sheet-shaped lightguide member is disposed adjacent to the operation panel.

Embodiments of the present invention will be explained below with reference to the accompanying drawings.

DETAILED DESCRIPTION OF THE PREFERRED EMBODIMENTS

Figure 3:
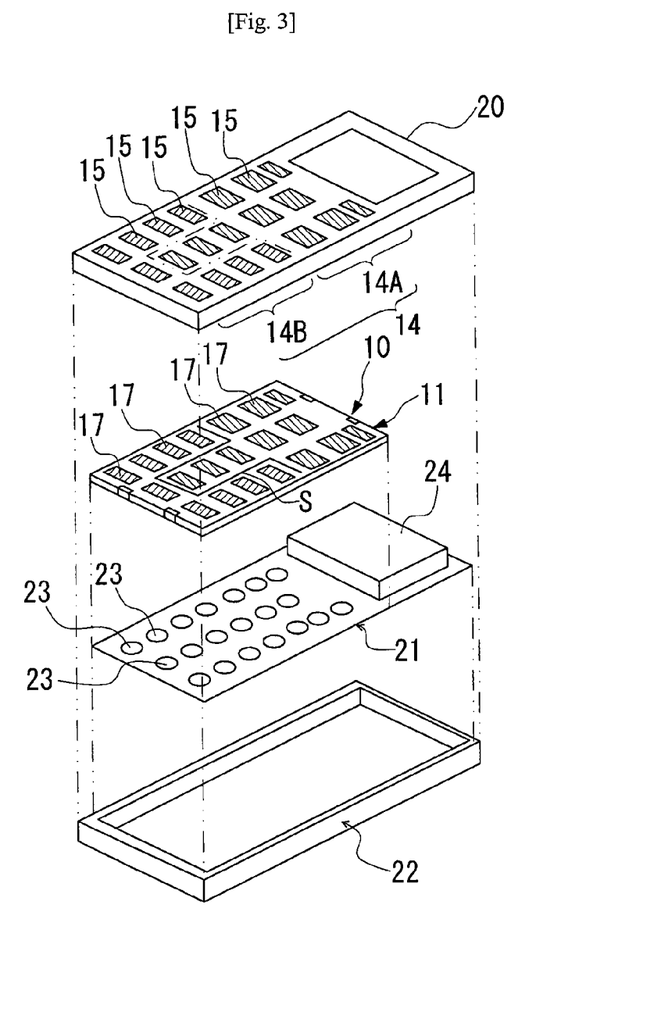
FIG. 3 is an exploded perspective view schematically showing a mobile phone using the sheet-shaped lightguide member shown in FIG. 1.

First, a mobile phone will be briefly explained with reference to FIG. 3 as an electronic device having a sheet-shaped lightguide member according to the present invention. The mobile phone has an upper casing member 20, an operation panel-lighting device 10, a substrate 21, and a lower casing member 22. The upper casing member 20 includes an operation panel 14 having a plurality of operation keys 15. The operation panel-lighting device 10 is disposed at a back of the operation panel 14. The substrate 21 has a liquid crystal display panel 24 mounted on the substrate 21, and further has switching elements 23 provided to correspond to the operation keys 15, respectively. The lower casing member 22 accommodates the operation panel-lighting device 10 and the substrate 21.

The substrate 21 may have electronic components (not shown), such as an IC that controls the mobile phone, and components for communications (not shown) such as an antenna member, which may be mounted on the substrate 21.

The liquid crystal display panel 24 is a transmissive or semitransmissive liquid crystal display panel. In the case of a semitransmissive liquid crystal display panel 24, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer. The semitransmissive liquid crystal display panel 24 further has a semitransmitting reflector having both light-transmitting and -reflecting functions, which is disposed underneath the panel body. It should be noted that the liquid crystal display panel 24 has a liquid crystal backlight unit (not shown) disposed at a back thereof.

The operation panel-lighting device 10 has a sheet-shaped lightguide member 11 disposed at the back of the operation panel 14 and two sets of light sources 3 (see FIG. 1) provided at two opposite edges along a peripheral edge surface 11C of the lightguide member 11.

Figure 1:
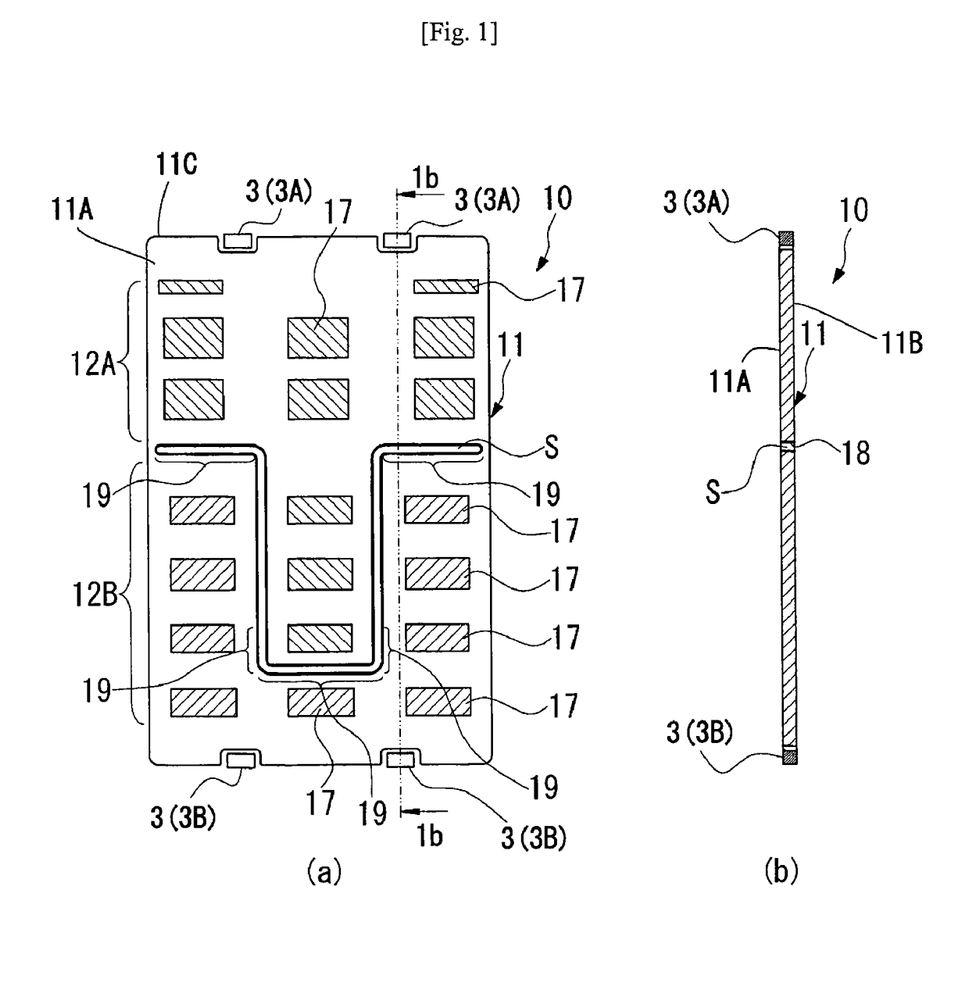
FIG. 1 is a diagram illustrating a sheet-shaped lightguide member according to a first embodiment of the present invention, of which: part (a) is a plan view of the lightguide member; and part (b) is a sectional view taken along the line 1b-1b in part (a).

The sheet-shaped lightguide member 11 is a flexible lightguide film made of a light-transmitting resin material, for example, which has a high pliability as a whole. The sheet-shaped lightguide member 11 has a plurality of light-scattering areas 17 serving as light-emitting areas corresponding to the operation keys 15. The lightguide member 11 guides light received from the light sources 3, deflects the guided light at the light-scattering areas 17 and emits the deflected light toward the corresponding operation keys 15 of the operation panel 14. The light-scattering areas 17 are formed, for example, by printing a large number of dots with a white ink on a second surface 11B opposite to the first surface 11A, or by evaporating silver onto the second surface 11B.

Figure 2:
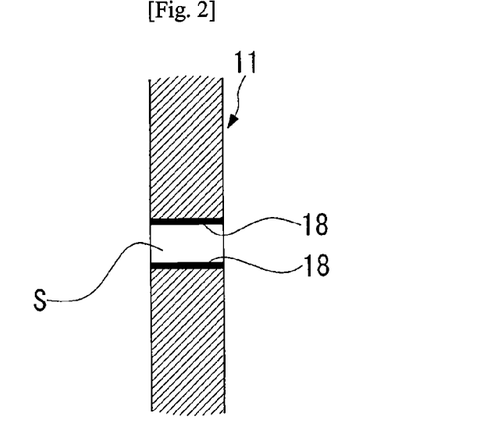
FIG. 2 is an enlarged sectional view of a main part of the sheet-shaped lightguide member shown in part (b) of FIG. 1.

The sheet-shaped lightguide member 11 according to this embodiment has a U-shaped slit S provided in a vertically central portion thereof as seen in part (a) of FIG. 1. Thus, the lightguide member 11 is divided into an upper first light exit area 12A and a lower second light exit area 12B. The slit S has a coating of light-blocking material 18 applied to at least a part of the wall surface in the slit S. The light-blocking material 18 may be a white, black or silver coating material, for example, which blocks light guided in the sheet-shaped lightguide member 11 from being transmitted through the slit S between the first and second light exit areas 12A and 12B. To coat the wall surface of the slit S with the light-blocking material 18, for example, a metal mask having a pattern corresponding to the slit S is laid over the sheet-shaped lightguide member 11, and a black ink is filled into the slit S to form an ink coating on the wall surface.

It should be noted that the coating of light-blocking material 18 need not be applied to the whole wall surface of the slit S but may be formed only on portions of the wall surface of the slit S where guided light from the light sources 3 is not totally reflected by the wall surface, e.g. portions 19 that face the light sources 3.

The light sources 3 are a plurality of white light-emitting diodes (LEDs) disposed along both longitudinally opposing ends (short sides) of the sheet-shaped lightguide member 11. Each white LED is, for example, a semiconductor light-emitting element mounted on a substrate and sealed with a resin material. The semiconductor light-emitting element is, for example, a blue (wavelength λ: 470 to 490 nm) LED element or an ultraviolet (wavelength λ: less than 470 nm) LED element, which is formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed by adding, for example, a YAG fluorescent substance into a silicone resin as a main component. The YAG fluorescent substance converts blue or ultraviolet light from the semiconductor light-emitting element into yellow light, and white light is produced by color mixing effect. It should be noted that white LEDs are not limited to those described above, but various white LEDs are usable. That is, it is possible to adopt various combinations of light-emitting elements that emit different colors of light and various combinations of a fluorescent substance and a light-emitting element.

The light sources 3 comprise two sets of light sources, i.e. first light sources 3A disposed along the end of the first light exit area 12A, and second light sources 3B disposed along the end of the second light exit area 12B. The light sources 3 are controlled to turn on for each of the light exit areas 12A and 12B. That is, the light sources 3 are selectively controlled according to the following lighting modes: first, the first light sources 3A are turned on; second, the second light sources 3B are turned on; and third, both the light sources 3A and 3B are simultaneously turned on.

Light entering the first light exit area 12A from the first light sources 3A is deflected upward and emitted at the light-scattering areas 17 and blocked from being guided into the adjacent second light exit area 12B by the light-blocking material 18 in the slit S. Therefore, the light guided in the first light exit area 12A illuminates only a first key area 14A of the operation panel 14 that corresponds to the first light exit area 12A. Similarly, light entering the second light exit area 12B from the second light sources 3B illuminates only a second key area 14B of the operation panel 14 that corresponds to the second light exit area 12B.

Figure 4:
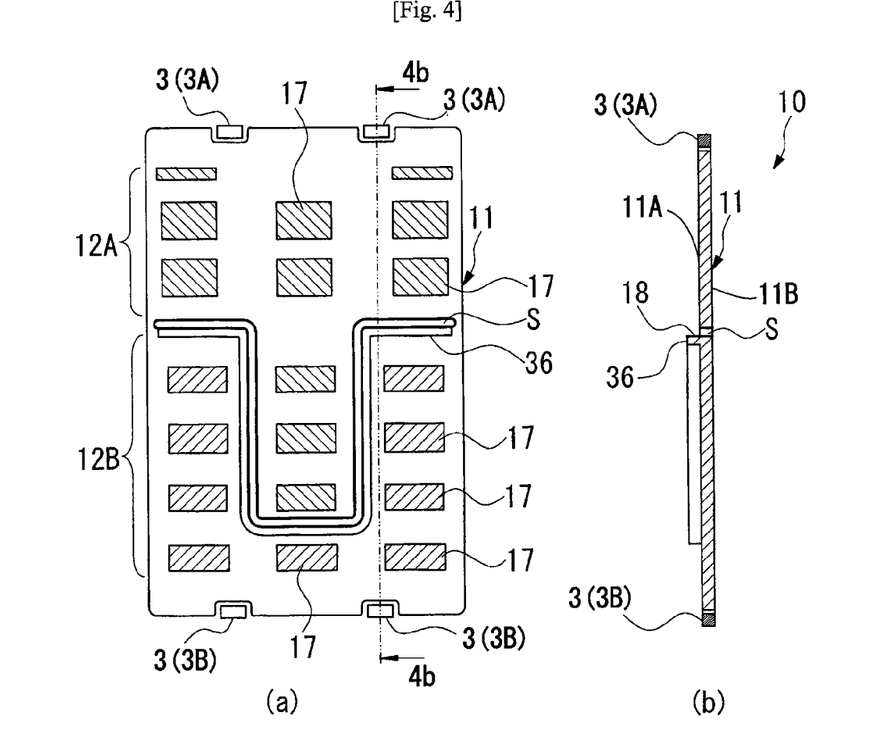
FIG. 4 is a diagram illustrating a sheet-shaped lightguide member according to a second embodiment of the present invention, of which: part (a) is a plan view of the lightguide member; and part (b) is a sectional view taken along the line 4b-4b in part (a).
Figure 5:
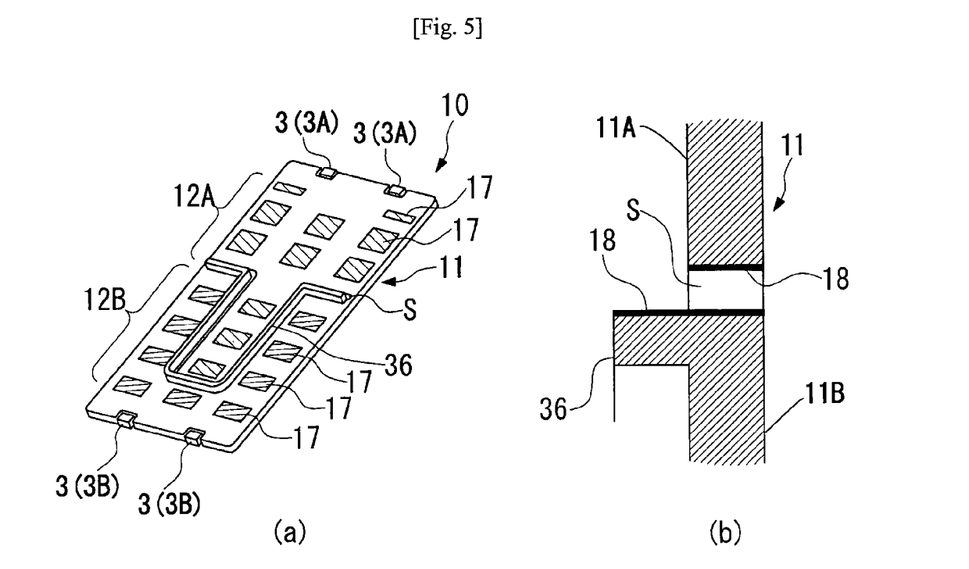
FIG. 5 is a diagram illustrating the sheet-shaped lightguide member shown in FIG. 4, of which: part (a) is a perspective view of the lightguide member; and part (b) is an enlarged sectional view of a main part of the lightguide member shown in part (b) of FIG. 4.

FIGS. 4 and 5 show a lighting device 10 according to a second embodiment of the present invention. The lighting device 10 has substantially the same structure as that of the foregoing first embodiment. In the second embodiment, the sheet-shaped lightguide member 11 has a wall portion 36 formed along the slit S to project toward the operation panel 14. A wall surface of the wall portion 36 that faces the slit S is covered with a light-blocking material 18. With this structure, a higher light-blocking effect can be obtained between the mutually adjacent light exit areas 12A and 12B.

FIGS. 8 to 12 show a lighting device 10 according to a third embodiment of the present invention. The lighting device 10 has a sheet-shaped reflecting member 48 disposed at a back or the second surface of the sheet-shaped lightguide member 11 to reflect light leaking out from the second surface of the lightguide member 11. The sheet-shaped reflecting member 48 has a surface that is entirely white, black or silver, for example, preferably a white or silver surface to efficiently reflect light leaking out from the sheet-shaped lightguide member 11.

The sheet-shaped reflecting member 48 is integrally formed with a light-blocking wall 48a extending along the slit S, which is to be inserted into the slit S. The light-blocking wall 48a is configured to project through the surface of the sheet-shaped lightguide member 11.

It should be noted that the present invention is not necessarily limited to the foregoing embodiments but can be modified in a variety of ways without departing from the scope of the present invention.

For example, the sheet-shaped lightguide member in each of the foregoing embodiments is divided into two light exit areas by the slit S. However, the arrangement may be as follows. The sheet-shaped lightguide member is divided into three or more light exit areas, and light sources are provided to correspond to each of the light exit areas.

The first light sources 3A and the second light sources 3B may use LEDs that emit mutually different colors of light. It is also possible to emit various colors of light by combining red, green and blue LEDs as light sources.

Although in the foregoing embodiments the present invention is applied to a mobile phone, the present invention is also applicable to other various electronic devices, e.g. personal digital assistants (PDAs), mobile personal computers (PCs), and mobile game machines.

What is claimed is:

1. A sheet-shaped lightguide member comprising:
   a first surface and a second surface that face each other; and
   a peripheral edge surface;
   the sheet-shaped lightguide member that receives light entering through at least a part of the peripheral edge surface and guides the light in the sheet-shaped lightguide member to emit the guided light from the first surface;
   the sheet-shaped lightguide member being divided into at least two light exit areas and further comprising:
   a light-blocking part provided along a boundary between mutually adjacent ones of the light exit areas to block transmission of light between the mutually adjacent ones of the light exit areas;
   wherein the light-blocking part comprises a slit provided along the boundary between the mutually adjacent ones of the light exit areas, the slit extending through the sheet-shaped lightguide member from the first surface to the second surface to separate the mutually adjacent ones of the light exit areas from each other, at least a part of a wall surface defining the slit being coated with a light-blocking material that blocks transmission of light between the mutually adjacent ones of the light exit areas.

2. The sheet-shaped lightguide member of claim 1, wherein at least a part of the wall surface defining the slit projects from the first surface to a side opposite to the second surface and is coated with the light-blocking material.

3. An operation panel-lighting device comprising:
   the sheet-shaped lightguide member of claim 2, the first surface of the sheet-shaped lightguide member being disposed adjacent to a back of an operation panel having light-transmitting display portions; and
   at least one light source provided adjacent to the peripheral edge surface of the sheet-shaped lightguide member to emit the guided light from at least one of the light exit areas.

4. An electronic device comprising:
   an operation panel having light-transmitting display portions; and
   the lighting device of claim 3, the first surface of the sheet-shaped lightguide member being disposed adjacent to the operation panel.

5. An operation panel-lighting device comprising:
   the sheet-shaped lightguide member of claim 1, the first surface of the sheet-shaped lightguide member being disposed adjacent to a back of an operation panel having light-transmitting display portions; and
   at least one light source provided adjacent to the peripheral edge surface of the sheet-shaped lightguide member to emit light into at least one of the light exit areas.

6. An electronic device comprising:
an operation panel having light-transmitting display portions; and
the lighting device of claim 5, the first surface of the sheet-shaped lightguide member being disposed adjacent to the operation panel.

7. An operation panel-lighting device comprising:
the sheet-shaped lightguide member of claim 1, the first surface of the sheet-shaped lightguide member being disposed adjacent to a back of an operation panel having light-transmitting display portions; and
at least one light source provided adjacent to the peripheral edge surface of the sheet-shaped lightguide member to emit the guided light from at least one of the light exit areas.

8. An electronic device comprising:
an operation panel having light-transmitting display portions; and
the lighting device of claim 7, the first surface of the sheet-shaped lightguide member being disposed adjacent to the operation panel.

9. A sheet-shaped lightguide member comprising:
a first surface and a second surface that face each other; and a peripheral edge surface;
the sheet-shaped lightguide member that receives light entering through at least a part of the peripheral edge surface and guides the light in the sheet-shaped lightguide member to emit the guided light from the first surface;
the sheet-shaped lightguide member being divided into at least two light exit areas and further comprising:
a light-blocking part provided along a boundary between mutually adjacent ones of the light exit areas to block transmission of light between the mutually adjacent ones of the light exit areas;
wherein the light-blocking part has a slit provided along the boundary between the mutually adjacent ones of the light exit areas, the slit extending through the sheet-shaped lightguide member from the first surface to the second surface to separate the mutually adjacent ones of the light exit areas from each other, the light-blocking part further comprising a light-blocking wall that is inserted into at least a part of the slit to block transmission of light between the mutually adjacent ones of the light exit areas.

10. The sheet-shaped lightguide member of claim 9, wherein the light-blocking wall projects from the first surface to a side opposite to the second surface.

11. The sheet-shaped lightguide member of claim 10, further comprising:
a sheet-shaped reflecting member disposed adjacent to the second surface to reflect light exiting from the second surface;
the light-blocking wall being provided to project from the sheet-shaped reflecting member.

12. An operation panel-lighting device comprising:
the sheet-shaped lightguide member of claim 11, the first surface of the sheet-shaped lightguide member being disposed adjacent to a back of an operation panel having light-transmitting display portions; and
at least one light source provided adjacent to the peripheral edge surface of the sheet-shaped lightguide member to emit the guided light from at least one of the light exit areas.

13. An electronic device comprising:
an operation panel having light-transmitting display portions; and
the lighting device of claim 12, the first surface of the sheet-shaped lightguide member being disposed adjacent to the operation panel.

14. An operation panel-lighting device comprising:
the sheet-shaped lightguide member of claim 10, the first surface of the sheet-shaped lightguide member being disposed adjacent to a back of an operation panel having light-transmitting display portions; and
at least one light source provided adjacent to the peripheral edge surface of the sheet-shaped lightguide member to emit the guided light from at least one of the light exit areas.

15. An electronic device comprising:
an operation panel having light-transmitting display portions; and
the lighting device of claim 14, the first surface of the sheet-shaped lightguide member being disposed adjacent to the operation panel.

16. An operation panel-lighting device comprising:
the sheet-shaped lightguide member of claim 9, the first surface of the sheet-shaped lightguide member being disposed adjacent to a back of an operation panel having light-transmitting display portions; and
at least one light source provided adjacent to the peripheral edge surface of the sheet-shaped lightguide member to emit the guided light from at least one of the light exit areas.

17. An electronic device comprising:
an operation panel having light-transmitting display portions; and
the lighting device of claim 16, the first surface of the sheet-shaped lightguide member being disposed adjacent to the operation panel.

* * * * *